US010731509B2

(12) United States Patent
Correia et al.

(10) Patent No.: US 10,731,509 B2
(45) Date of Patent: *Aug. 4, 2020

(54) COMPLIANT SEAL COMPONENT AND ASSOCIATED METHOD

(71) Applicant: General Electric Company, Schenectady, NY (US)

(72) Inventors: Victor Hugo Silva Correia, Milton Mills, NH (US); Jonathan David Baldiga, Amesbury, MA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,033

(22) Filed: Jul. 16, 2019

(65) Prior Publication Data

US 2019/0338668 A1    Nov. 7, 2019

Related U.S. Application Data

(63) Continuation of application No. 15/810,448, filed on Nov. 13, 2017, now Pat. No. 10,392,967.

(51) Int. Cl.
*F01D 25/12* (2006.01)
*F01D 11/00* (2006.01)
*F16J 15/02* (2006.01)

(52) U.S. Cl.
CPC .......... *F01D 25/12* (2013.01); *F01D 11/005* (2013.01); *F05D 2240/11* (2013.01); *F05D 2240/24* (2013.01); *F05D 2260/201* (2013.01); *F16J 15/022* (2013.01)

(58) Field of Classification Search
CPC .... F01D 11/005; F01D 25/12; F05D 2240/11; F05D 2240/24; F05D 2260/201; F16J 15/022
See application file for complete search history.

(56) References Cited

U.S. PATENT DOCUMENTS

| | | | |
|---|---|---|---|
| 5,630,593 A | 5/1997 | Swensen et al. |
| 6,199,871 B1 | 3/2001 | Lampes |
| 6,237,921 B1 | 5/2001 | Liotta et al. |
| 6,325,392 B1 | 12/2001 | Halling |
| 6,431,825 B1 | 8/2002 | McLean |
| 6,568,692 B2 | 5/2003 | Kolodziej et al. |
| 7,101,147 B2 | 9/2006 | Balsdon |

(Continued)

*Primary Examiner* — Eugene G Byrd
(74) *Attorney, Agent, or Firm* — McGarry Bair PC

(57) ABSTRACT

A compliant seal component, a turbomachine including such compliant seal component, and an associated method for cooling the compliant seal component disposed in the turbomachine are disclosed. The compliant seal component includes a convoluted portion and a plurality of end portions spaced apart from each other. The plurality of end portions is joined to the convoluted portion. An end portion of the plurality of end portions includes a first section and a second section, the second section defining a plenum. The end portion further includes a plurality of inlet holes and a plurality of outlet holes. The plurality of inlet holes is configured to direct a portion of a cooling fluid to the plenum. The portion of the cooling fluid in the plenum is configured to cool the end portion. The plurality of outlet holes is configured to discharge the portion of the cooling fluid from the plenum.

17 Claims, 6 Drawing Sheets

(56) References Cited

U.S. PATENT DOCUMENTS

| | | |
|---|---|---|
| 7,152,864 B2 | 12/2006 | Amos et al. |
| 7,571,614 B2 | 8/2009 | Lejars et al. |
| 8,162,327 B2 | 4/2012 | Halling |
| 8,661,828 B2 | 3/2014 | Pieussergues et al. |
| 8,814,175 B2 | 8/2014 | Tohdoh |
| 9,556,750 B2 | 1/2017 | Freeman et al. |
| 9,957,827 B2 | 5/2018 | Davis et al. |
| 10,240,473 B2 | 3/2019 | Davis |
| 10,392,967 B2 * | 8/2019 | Correia ................ F01D 11/005 |
| 2010/0247005 A1 | 9/2010 | Aschenbruck et al. |
| 2013/0074338 A1 | 3/2013 | Swensen et al. |
| 2013/0084166 A1 | 4/2013 | Klingels |
| 2015/0001814 A1 | 1/2015 | Roge et al. |
| 2015/0102565 A1 | 4/2015 | Feldmann et al. |
| 2015/0167557 A1 | 6/2015 | Thomas et al. |
| 2015/0345317 A1 | 12/2015 | Mareix et al. |
| 2015/0345319 A1 | 12/2015 | Zelesky et al. |
| 2016/0115807 A1 | 4/2016 | Davis et al. |
| 2018/0017168 A1 | 1/2018 | Davis et al. |
| 2018/0328214 A1 | 11/2018 | Barak et al. |

* cited by examiner

COMPLIANT SEAL COMPONENT AND ASSOCIATED METHOD

CROSS-REFERENCE TO RELATED APPLICATION

The present application is a continuation of U.S. patent application Ser. No. 15/810,448, filed Nov. 13, 2017, now U.S. Pat. No. 10,392,967, issued Aug. 27, 2019, which is incorporated herein by reference in its entirety.

BACKGROUND

The present disclosure relates to turbomachines, and more particularly to a compliant seal component for turbomachines and an associated method for cooling the compliant seal component.

Seal components, such as a compliant seal component, which can operate at high operating temperatures may be desirable in many industrial applications to efficiently control leakage of fluid. For example, a shroud and a nozzle assembly of a gas turbine engine, which are exposed to the high operating temperatures in a turbomachine, may include the compliant seal component to control leakage of the fluid between a hot flow path of the turbomachine and a turbomachine cavity of the turbomachine. In such an application, a cooling fluid is typically supplied from an external fluid source for cooling the compliant seal component. However, the cooling fluid may not be effective in cooling portions of the compliant seal component that are in contact with the turbomachine, thereby resulting in creep and degradation of the compliant seal component over the duration of use. The degraded or creeped compliant seal component may inadvertently cause increased leakage of the cooling fluid into the main flow path, thereby reducing the efficiency of the turbomachine. Further, the degraded compliant seal component may warrant stoppage of the turbomachine for replacement of the compliant seal component, thus affecting continued operation of the turbomachine. Accordingly, there is a need for an improved compliant seal component.

BRIEF DESCRIPTION

An aspect of the present description relates to turbomachine, comprising: a first component, a second component, a hot flowpath adjacent at least one portion of the first component or one portion the second component, and a compliant seal component disposed in a clearance defined between the first component and the second component, wherein the compliant seal component comprises a convoluted portion and a plurality of end portions spaced apart from each other and contacts the first component and the second component respectively, wherein the plurality of end portions is joined to the convoluted portion, wherein an end portion of the plurality of end portions comprises a first section and a second section, the second section defining a plenum, wherein the end portion further comprises a plurality of inlet holes and a plurality of outlet holes.

BRIEF DESCRIPTION OF THE DRAWINGS

These and other features and aspects of embodiments of the present technique will become better understood when the following detailed description is read with reference to the accompanying drawings in which like characters represent like parts throughout the drawings, wherein.

DETAILED DESCRIPTION

Figure 1A:
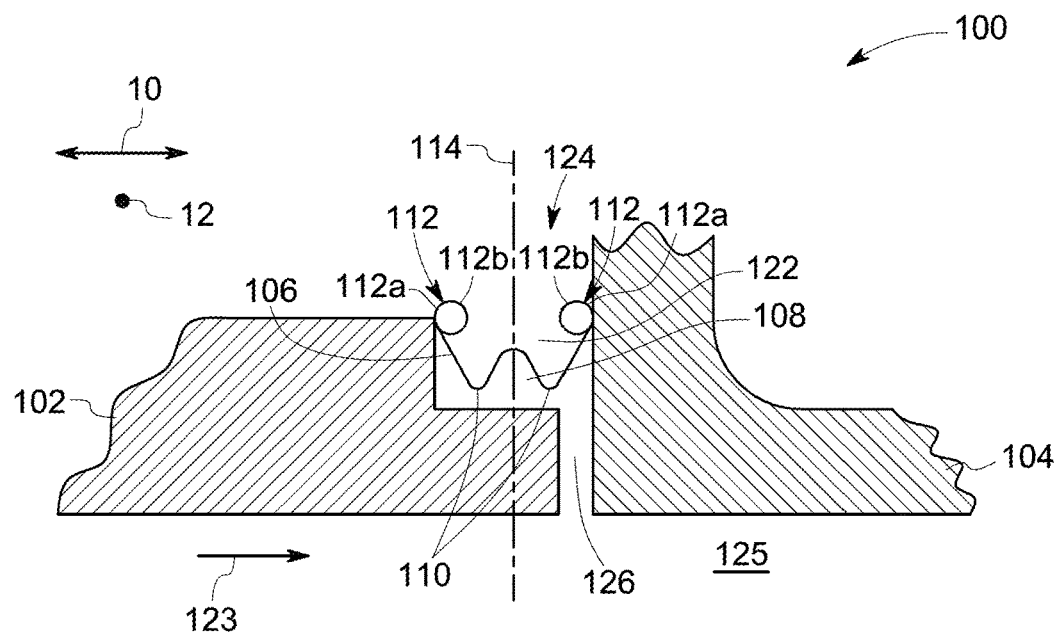
FIG. 1A is a block diagram of a portion of a turbomachine including a compliant seal component, in accordance with an embodiment of the description.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

Unless defined otherwise, technical and scientific terms used herein have the same meaning as is commonly understood by one of skill in the art to which this description belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. In the following specification and the claims that follow, the singular forms "a", "an" and "the" include plural referents unless the context clearly dictates otherwise.

To more clearly and concisely describe and point out the subject matter, the following definitions are provided for specific terms, which are used throughout the following description and the appended claims, unless specifically denoted otherwise with respect to a particular embodiment. The term "convoluted portion" as used herein refers to a curved portion or a ridged portion of a compliant seal component. The term "centerline axis" as used herein refers to an imaginary line positioned at the mid-portion of the compliant seal component and extending along circumferential direction of the compliant seal component. The term "bent outwardly" as used herein refers to a second section of the end portion bent away from the centerline axis. The term "bent inwardly" as used herein refers to the second section of the end portion bent towards the centerline axis. The term "plenum" as used herein refers to a conduit disposed within the compliant seal component and extending along a circumferential direction of the compliant seal component. The term "sub-plenums" as used herein refers to discrete conduits disposed adjacent to one another and extending along the circumferential direction. The term "turbulator" as used herein refers to a component which increases surface area of the plenum and dissipates substantially large quantity of heat from at least one of a first and a second component. The term "oriented" as used herein refers to aligning or positioning an outlet hole at a pre-defined angle for directing the cooling fluid towards or away from the convoluted portion. The term "first cavity" as used herein refers to a band cavity of a nozzle or a rotor of the turbomachine. The term "second cavity" as used herein refers to a buffer cavity disposed adjacent to a hot flow path of the turbomachine. Fluid in the band cavity is relatively at a high-pressure and cooler in comparison with fluid in the buffer cavity and the hot flow path. The term "first section" as used herein refers to a portion of the end portion joined to the convoluted portion or extending from the convoluted portion. The term "second section" as used herein refers to a portion of the end portion extending from the first section or coupled to the first section.

In some embodiments, a compliant seal component for a turbomachine is presented. The compliant seal component includes a convoluted portion and a plurality of end portions spaced apart from each other. The plurality of end portions is joined to the convoluted portion. An end portion of the plurality of end portions includes a first section and a second section, the second section defining a plenum. The end portion further includes a plurality of inlet holes and a plurality of outlet holes. The plurality of inlet holes is configured to direct a portion of a cooling fluid to the plenum and the portion of the cooling fluid in the plenum is configured to cool the end portion. The plurality of outlet holes is configured to discharge the portion of the cooling fluid from the plenum.

In some embodiments, a turbomachine is presented. The turbomachine includes a first component, a second component, and a compliant seal component disposed in a clearance defined there between the first component and the second component. The complaint seal component includes a convoluted portion and a plurality of end portions spaced apart from each other and contacts the first component and the second component respectively. An end portion of the plurality of end portions includes a first section and a second section, the second section defining a plenum. The end portion further includes a plurality of inlet holes and a plurality of outlet holes. The plurality of inlet holes is configured to direct a portion of a cooling fluid from a first cavity of the turbomachine to the plenum. The portion of the cooling fluid in the plenum is configured to cool the end portion. The plurality of outlet holes is configured to discharge the portion of the cooling fluid from the plenum to a second cavity of the turbomachine.

In some embodiments, the plenum may be formed by bending the second section outwardly relative to a centerline axis of the compliant seal component. In some other embodiments, the plenum may be formed by bending the second section inwardly relative to the centerline axis. In some other embodiments, the plenum may be formed by the second section having a hollow component that is coupled to the first section. In some embodiments, the compliant seal component further includes a plurality of walls spaced apart from each other, disposed within the plenum. In such an embodiment, the plurality of walls and the end portion defines a plurality of sub-plenums. Further, a portion of the end portion corresponding to a sub-plenum of the plurality of sub-plenums includes an inlet hole of the plurality of inlet holes and an outlet hole of the plurality of outlet holes. In some embodiments, the plurality of outlet holes is positioned at a circumferentially different location than that of the plurality of inlet holes, to ensure that the cooling fluid flows along the plenum to provide the necessary cooling to the end portion. In some other embodiments, the compliant seal component further includes a turbulator disposed within the plenum and coupled to at least a portion of an inner surface of the end portion. The turbulator is configured to increase the surface area of the plenum and dissipate substantially large quantity of heat from at least one of a first and second components. In certain embodiments, the plurality of outlet holes is oriented to direct the portion of the cooling fluid towards the convoluted portion for cooling the convoluted portion. In certain other embodiments, the plurality of outlet holes is oriented to direct the portion of the cooling fluid away from the convoluted portion for cooling another portion of the first and second components.

FIG. 1A illustrates a block diagram of a portion of a turbomachine 100 according to one embodiment of the description. In one example embodiment, the portion of the turbomachine 100 includes a first component 102, a second component 104, and a compliant seal component 106. The first component 102 and the second component 104 are disposed spaced apart from each other to prevent contacting one another. In some embodiments, the first component 102 and the second component 104 may be stationary components. In such an embodiment, non-limiting example of the first component 104 may be a shroud of the turbomachine and the second component 104 may be a nozzle of the turbomachine. In some other embodiments, the first component 102 and the second component 104 may be rotatable components. In such an embodiment, non-limiting example of the first component 102 may be a disk and the second component may be a blade retainer. In certain embodiments, at least one of the first component 102 and the second component 104 includes a ceramic matrix composite material (CMC material). In certain other embodiments, the first component 102 includes a CMC material and the second component 104 includes a metallic material.

As mentioned earlier, the compliant seal component 106 includes a convoluted portion 110 and a plurality of end portions 112. In the embodiment illustrated in FIG. 1A, there are two convoluted portions 110 that are coupled to each other. However, in some other embodiments, the number of convoluted portions 110 may vary depending on the application and design criteria. End portions of the plurality of end portions 112 are spaced apart from each other along an axial direction 10 or a longitudinal direction of the turbomachine 100. Each end portion of the plurality of end portions 112 includes a first section 112a and a second section 112b. Further, the plurality of end portions 112 is joined to the convoluted portion 110. In one example embodiment, the first section 112a is joined to the convoluted portion 110 and the second section 112b extends outwardly from the first section 112a and defines a plenum 116. In some embodiments, the plurality of end portions 112, for example, the first section 112a and the convoluted portion 110 are joined to one another using known coupling techniques, such as welding, brazing, and the like. In some other embodiments, the plurality of end portions 112, for example, the first section 112a of the plurality of end portions 112 and the convoluted portion 110 are integral components. It should be noted herein that the term "integral component" refers to a monolithic component i.e., a component manufactured as a single piece. In the illustrated embodiment, the second section 112b of the plurality of end portions 112 is bent relative to a centerline axis 114 of the compliant seal component 106 to define a plenum 116. In the embodiment of FIG. 1A, the second section 112b is bent inwardly relative to the centerline axis 114. In some embodiments, the end portion 112 includes a plurality of inlet holes 118 and a plurality of outlet holes 120. In one example embodiment, the first section 112a includes the plurality of outlet holes 120 and the second section 112b includes the plurality of inlet holes 118. In some embodiments, the compliant seal component 106 is disposed in a clearance 108 defined there between the first component 102 and the second component 104 such that the plurality of end portions 112 contacts a portion of the first and second components 102, 104 respectively.

Figure 1B:
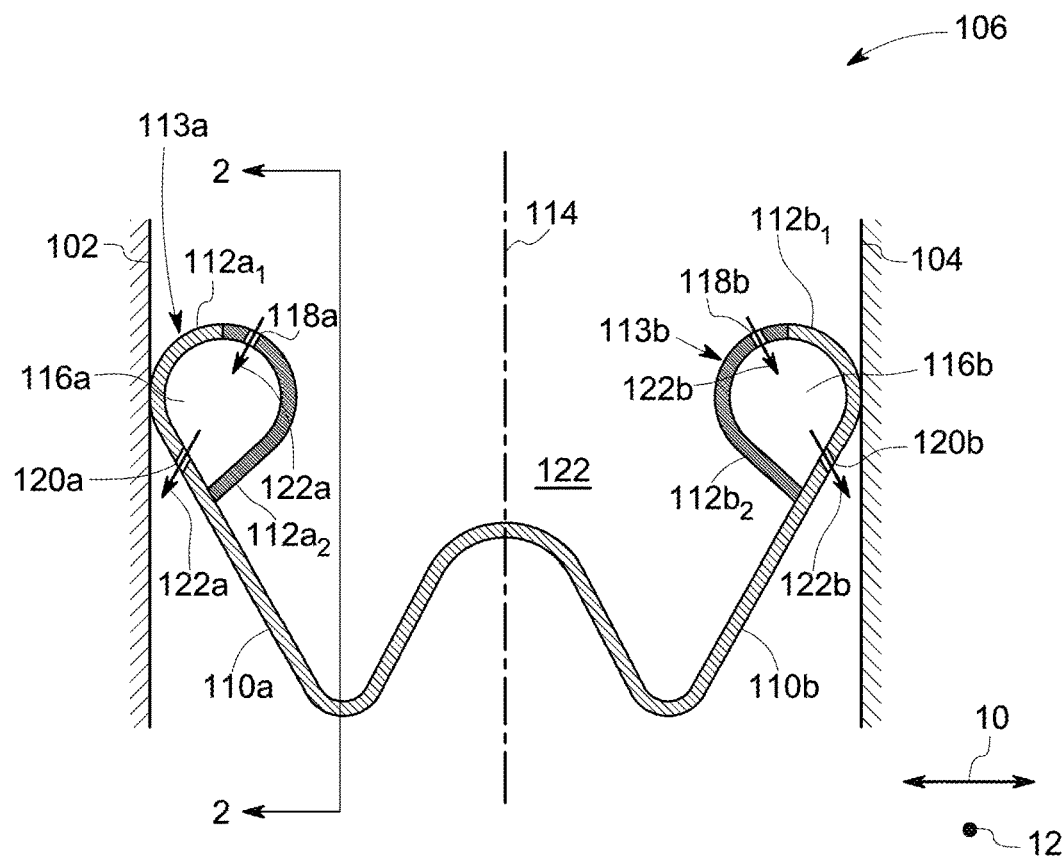
FIG. 1B is an expanded view of a compliant seal component, in accordance with an embodiment of the description.

FIG. 1B further illustrates an expanded view of the compliant seal component 106 of FIG. 1A. In the embodiment illustrated in FIG. 1B, the plurality of end portions 112 includes a first end portion 113a and a second end portion 113b. In one embodiment, the first end portion 113a is coupled to a first convoluted portion 110a, a second end portion 113b is coupled to a second convoluted portion 110b, and the first and second convoluted portions 110a, 110b are coupled to one another. In such an example embodiment, a first section $112a_1$ of the first end portion 113a is coupled to the first convoluted portion 110a and a first section $112b_1$ of the second end portion 113b is coupled to the second convoluted portion 110b. Further, a second section $112a_2$ of the first end portion 113a extends from the first section $112a_1$ and bent inwardly relative to the centerline axis 114 to define a first plenum 116a. Similarly, a second section $112b_2$ of the second end portion 113b extends from the first section $112b_1$ and bent inwardly relative to the centerline axis 114 to define a second plenum 116b. The first end portion 113a further includes a first inlet hole 118a and a first outlet hole 120a, and the second end portion 113b includes a second inlet hole 118b and a second outlet hole 120b. In the illustrated embodiment, the first section $112a_1$ includes the first outlet hole 120a the second section $112a_2$ includes the first inlet hole 118a, the first section $112b_1$ includes the second outlet hole 120b, the second section $112b_2$ includes the second first hole 118b. The position of the plurality of first and second inlet holes 118a, 118b and the plurality of first and second outlet holes 120a, 120b may vary depending on the application and design criteria. The first end portion 113a contacts a portion of the first component 102 and the second end portion 113b contacts a portion of the second component 104.

Figure 2:
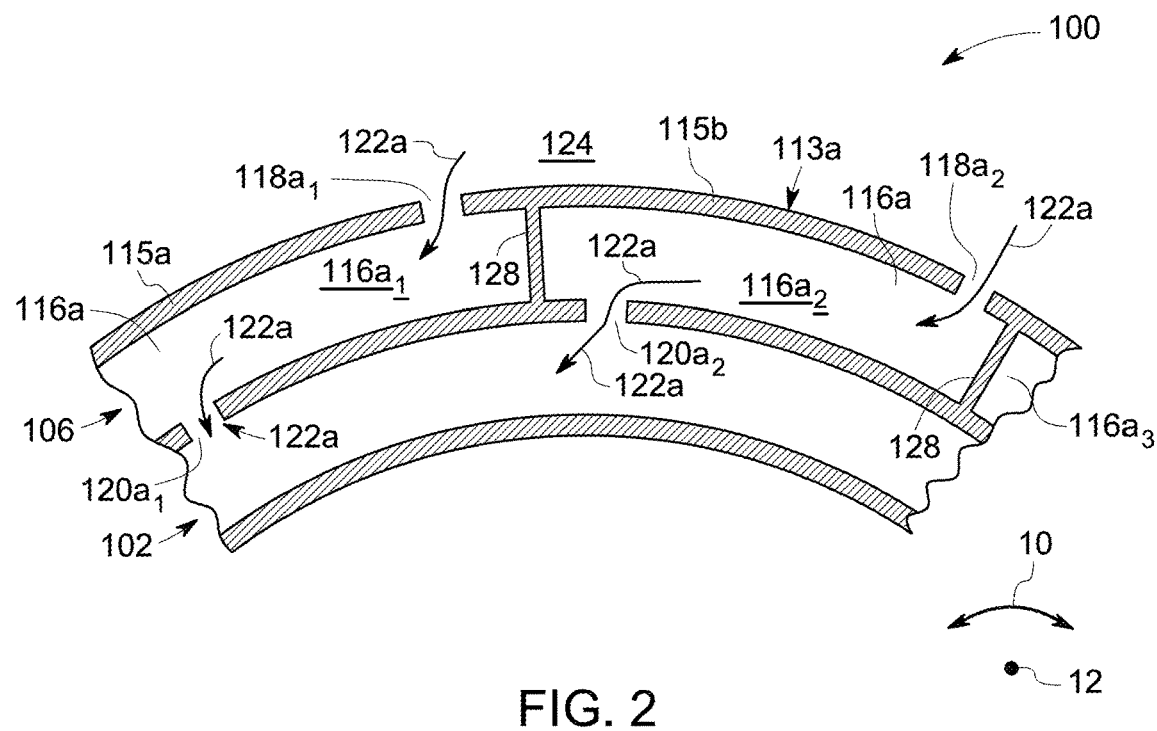
FIG. 2 is a sectional view of the compliant seal component taken along line A-A in FIG. 1B, in accordance with an embodiment of the description.

Referring again to FIG. 1A, the compliant seal component 106 extends along a circumferential direction 12 of the turbomachine 100. In some example embodiments, the compliant seal component 106 has a circular profile or an oval profile. Non-limiting examples of suitable materials for the compliant seal component 106 include Nickel based alloys. The compliant seal component 106 may be flexible in nature, thereby allowing the first and second end portions 113a, 113b (as shown in FIG. 2) to bend relative to the centerline axis 114, thereby firmly contacting the first and second components 102, 104. This may result in effective sealing of the clearance 108 and also dampening of the vibrations generated in the turbomachine 100.

During operation of the turbomachine 100, the compliant seal component 106 is configured to receive cooling fluid 122 from a first cavity 124 of the turbomachine 100. Non-limiting examples of suitable cooling fluid 122, include air, water, nitrogen, and the like. In certain embodiments, the cooling fluid 122 may be a bleed fluid from a compressor (not shown) of the turbomachine 100. In some embodiments, the first cavity 124 may be a shroud cavity or a band cavity, which is configured to receive compressor bleed fluid (i.e., the cooling fluid 122). The turbomachine 100 may further receive hot flow path fluid 123 directed from a combustor along a hot flow path 125. In one example embodiment, the hot flow path fluid 123 may be directed on the first component 102 and the second component 104 to extract work from the hot flow path fluid 123. As illustrated in FIG. 1A, in some embodiments, the compliant seal component 106 is disposed in the clearance 108 and configured to regulate leakage of the cooling fluid 122 from the first cavity 124 into the hot flow path 125 via a second cavity 126 of the turbomachine 100. As mentioned earlier, typically, the hot flow path fluid 123 may heat the first and second components 102, 104, thereby heating the first and second end portions 113a, 113b of the compliant seal component 106, which are in contact with the portion of the first and second components 102, 104, thereby resulting in creep and degradation of the compliant seal component 106. Embodiments of the present disclosure may address at least some of the challenges posed by the heating of the compliant seal component 106.

Referring again to FIG. 1B, in the example embodiment, the plurality of first inlet holes 118a, 118b is configured to direct portions 122a, 122b of the cooling fluid 122 from the first cavity 124 of the turbomachine 100 to the first and second plenums 116a, 116b, respectively. The portions 122a, 122b of the cooling fluid 122 in the first and second plenums 116a, 116b, respectively are configured to cool the first and second end portions 113a, 113b. Further, the plurality of first and second outlet holes 120a, 120b are configured to discharge the portion 122a, 122b of the cooling fluid 122 from the first and second plenums 116a, 116b to the second cavity 126 and the hot flow path 125 of the turbomachine 100. Pressure of the cooling fluid 122 in the first cavity 124 may be substantially higher than pressure of the hot flow path fluid 123 in the second cavity 126 and the hot flow path 125. In the illustrated embodiment, the first and second outlet holes 120a, 120b are oriented such that the portions 122a, 122b of the cooling fluid 122 is directed or discharged away from the respective convoluted portions 110a, 110b, thereby further cooling another portion of the first and second components 102, 104, before mixing with the hot flow path fluid 123 in the second cavity 126 and the hot flow path fluid 123. In other words, the inwardly bent second sections $112a_2$, $112b_2$ allow the portion 122a, 122b of the cooling fluid 122 to impinge on adjacent structures i.e., other portion of the first and second components 102, 104 and cooling them before mixing with the hot flow path fluid 123 in the second cavity 126 and the hot flow path 125. As discussed herein, the cooling fluid 122 directed into the first and second plenums 116a, 116b may cool the portions of the first and second end portions 113a, 113b, which contact the first and second components 102, 104, thus minimizing degradation and creeping of the compliant seal component 106, and increasing the shelf life of the compliant seal component 106.

FIG. 2 is a sectional view of the compliant seal component 106 taken along line A-A in FIG. 1 according to one embodiment of the description. In the illustrated embodiment, the compliant seal component 106 further includes a plurality of walls 128 disposed within the plenum 116 and spaced apart from each other. In some embodiments, the plurality of walls 128 is disposed along the circumferential direction 12 of the turbomachine. In the illustrated embodiment, the plurality of walls 128 is disposed within the first plenum 116a. In such an example embodiment, the plurality of walls 128 and the first end portion 113a defines a plurality of first sub-plenums $116a_1$, $116a_2$, $116a_3$ (also referred to as a "plurality of first sub-plenums"). In some other embodiments, the first end portion 113a may be crimped at certain intervals to define a plurality of first sub-plenums $116a_1$, $116a_2$, $116a_3$. In the illustrated embodiment, a portion 115a of the first end portion 113a corresponding to the first sub-plenum $116a_1$ includes one first inlet hole $118a_1$ of the plurality of first inlet holes 118a and one first outlet hole $120a_1$ of the plurality of first outlet holes 120a. Similarly, a portion 115b of the first end portion 113a corresponding to the first sub-plenum $116a_2$ includes one first inlet hole $118a_2$ of the plurality of first inlet holes 118a and one first outlet hole $120a_2$ of the plurality of first outlet holes 120a. The first inlet holes $118a_1$, $118a_2$ are configured to direct the portion 122a of the cooling fluid 122 from the first cavity 124 to each of the plurality of first sub-plenums $116a_1$, $116a_2$. The plurality of first sub-plenums $116a_1$, $116a_2$ are configured to cool the first end portion 113a which contacts a portion of the first component 102. Although not illustrated, the plurality of walls 128 may be disposed in the second plenum 116b such that the plurality of walls 128 and the second end portion 113b may define the plurality of second sub-plenums, as discussed herein without deviating from the scope of the present disclosure. The plurality of first sub-plenums $116a_1$, $116a_2$ allow the portion 122a of the cooling fluid 122 in each sub-plenums $116a_1$, $116a_2$ to cool a relatively less area per the inlet of the cooling fluid 122, thus allowing each portion 122a of the cooling fluid 122 to dissipate less heat and provide a uniformly cooled compliant seal component 106.

Figure 3:
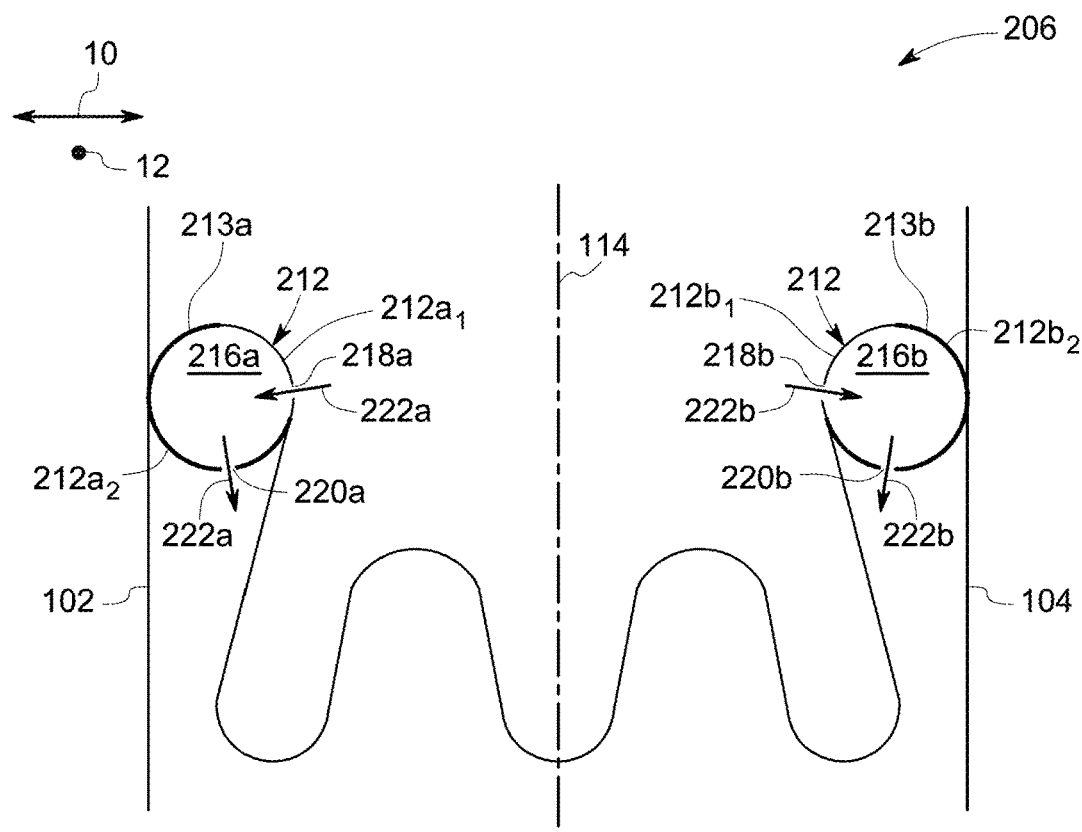
FIG. 3 is a block diagram of a compliant seal component, in accordance with an embodiment of the description.

FIG. 3 is a block diagram of a compliant seal component 206 according to another embodiment of the description. In the illustrated embodiment, the compliant seal component 206 includes a convoluted portion 210 and a plurality of end portions 212. In the embodiment of FIG. 3, there are three convoluted portions 210 that are coupled to each other. The plurality of end portions 212 includes a first end portion 213a and a second end portion 213b. The first end portion 213a includes a first section $213a_1$ and a second section $213a_2$. Similarly, the second end portion 213b includes a first section $213b_1$ and a second section $213b_2$. As discussed, in the embodiment of FIG. 2, the convoluted portions 210 and the plurality of end portions 212 are integral component of the compliant seal component 206. It should be noted herein that the term "integral component" refers to a monolithic component i.e., a component manufactured as a single piece. In some other embodiments, the plurality of end portions 212 may be coupled to the convoluted portion 210. Specifically, the second sections $213a_2$, $213b_2$ of the plurality of end portions 212 includes a hollow component (not shown) that may be coupled to the corresponding first section $213a_1$, $213b_1$ of the plurality of end portions 212. In one example embodiment, a second section $213a_2$ of the first end portion 213a is bent outwardly relative to a centerline axis 214 of the compliant seal component 206 to define a first plenum 216a. Similarly, a second section $213a_2$ of the second end portion 213b is bent outwardly relative to the centerline axis 214 to define a second plenum 216b, The first end portion 213a includes a plurality of first inlet holes 218a and a plurality of second outlet holes 220a. It should be noted herein that only one first inlet hole 218a and first outlet hole 220a are shown in the embodiment of FIG. 3, for ease of depiction. In the illustrated embodiment, first section $213a_1$ includes the first inlet hole 218a and the second section $213a_2$ includes the first outlet hole 220a. The second end portion 213b includes a plurality of second inlet holes 218b and a plurality of second outlet holes 220b. It should be noted herein that only one second inlet hole 218b and second outlet hole 220b are shown in the embodiment of FIG. 3, for ease of depiction. In the illustrated embodiment, first section $213b_1$ includes the second inlet hole 218b and the second section $213b_2$ includes the second outlet hole 220b. In the illustrated embodiment, the first and second outlet holes 220a, 220b are oriented such that portions 222a, 222b of cooling fluid 222 is directed or discharged towards the convoluted portion 210, thereby cooling the convoluted portion 210, before mixing with hot flow path fluid in a second cavity and a hot flow path of a turbomachine. In other words, the outwardly bent second sections $213a_2$, $213b_2$ allow the portion 222a, 222b of the cooling fluid 222 to impinge the convoluted portion 210 and cooling them before mixing with the hot flow path fluid in the second cavity and the hot flow path.

Figure 4A:
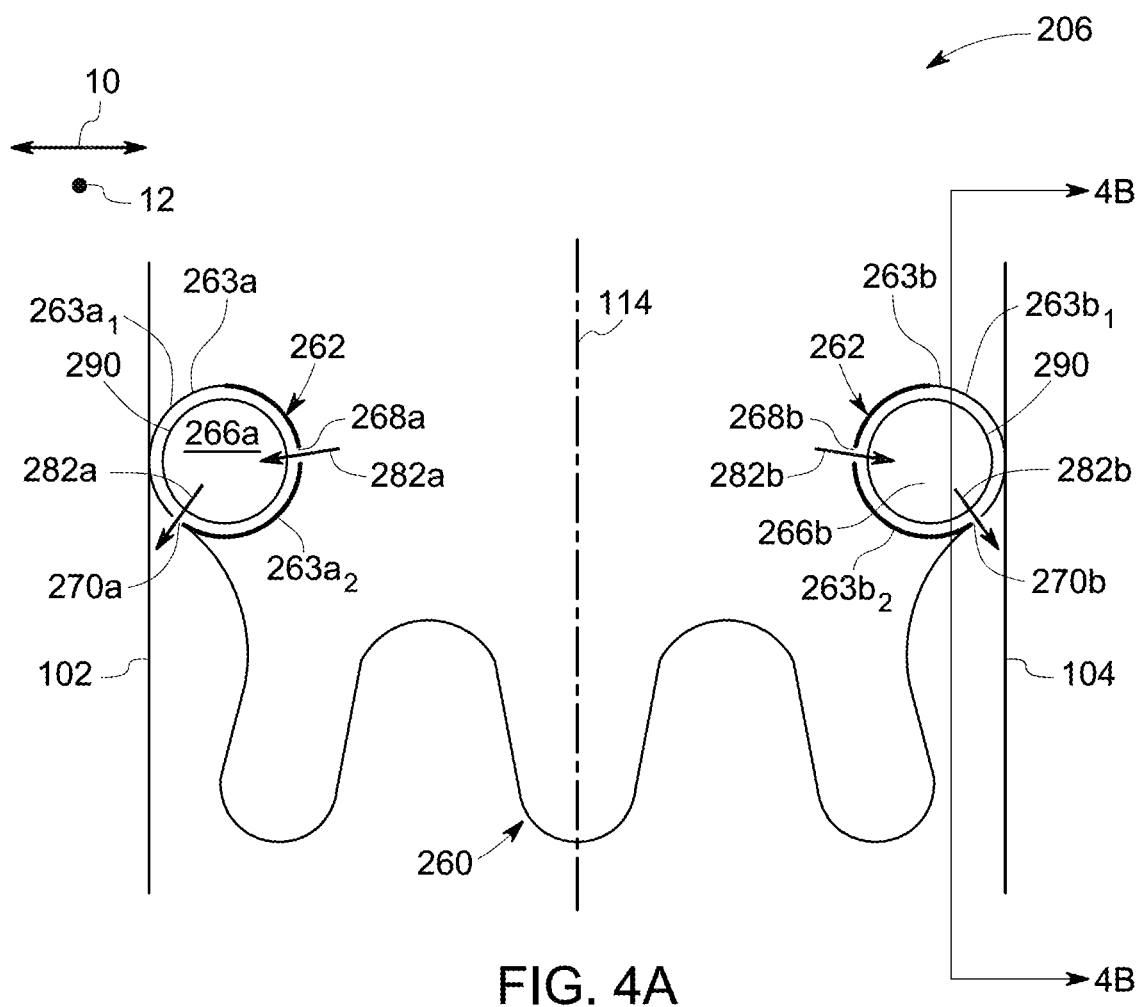
FIG. 4A is block diagram of a compliant seal component including a plurality of turbulators, in accordance with an embodiment of the description.
Figure 4B:
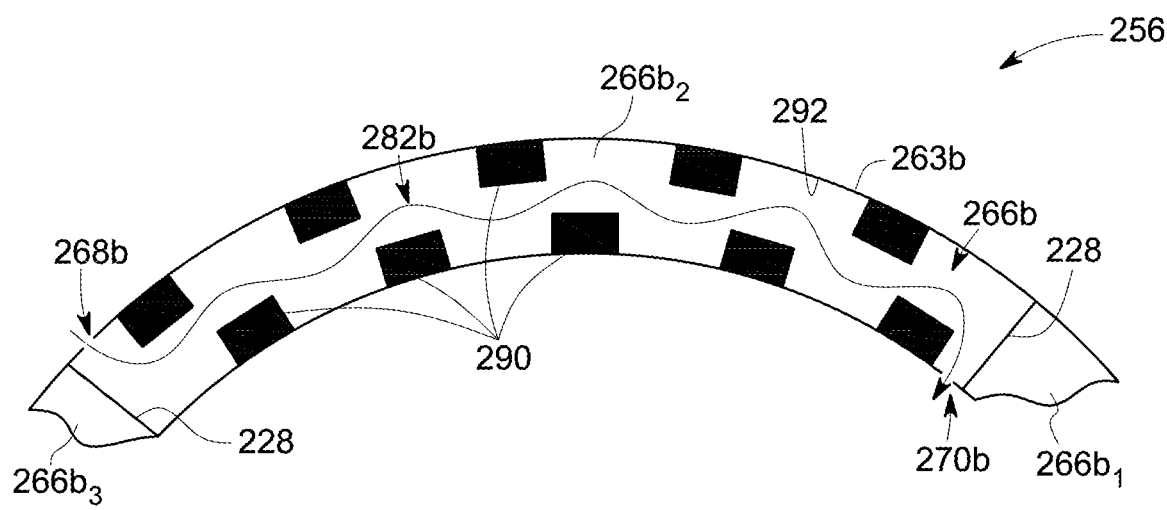
FIG. 4B is a sectional view of one end portion of the compliant seal component taken along line B-B in FIG. 4A, in accordance with an embodiment of the description.

FIG. 4A is a block diagram of a compliant seal component 256 according to one embodiment of the description. The compliant seal component 256 includes a convoluted portion 260 and a plurality of end portions 262. The plurality of end portions 262 includes a first end portion 263a and a second end portion 263b. The first end portion 263a includes a first section $263a_1$ and a second section $263a_2$. Similarly, the second end portion 263b includes a first section $263b_1$ and a second section $263b_2$. In one example embodiment, the first section $263a_1$ contacts a first component 102 and the second section $263a_2$ extends from the first section $263a_1$ and bent inwardly relative to a centerline axis 114 of the compliant seal component 256 to define a first plenum 266a. Similarly, the first section $263b_1$ contacts a second component 104 and the second section $263b_2$ extends from the first section $263b_1$ and bent inwardly relative to the centerline axis 114 to define a second plenum 266b. In such an example embodiment, the first end portion 263a and the second end portions 263b are integrated to the convoluted portion 260 to form a monolithic component i.e., compliant seal component 256. In some other embodiments, each of the second sections $263a_2$, $263b_2$ may include a separate hollow component, that defines the first and second plenums 266a, 266b respectively. In such an example embodiment, the second sections $263a_2$, $263b_2$ may be coupled to the respective first sections $263a_1$, $263b_1$ using suitable coupling mechanisms, such as brazing, welding, and the like to form the compliant seal component 256. In some embodiments, the first and second components 102, 104 are stationary components. In some other embodiments, the first and second components 102, 104 are rotatable components. The first end portion 263a further includes a first inlet hole 268a and a first outlet hole 270a. Similarly, the second end portion 263b includes a second inlet hole 268b and a second outlet hole 270b. In the illustrated embodiment of FIG. 4A, the compliant seal component 256 further includes a plurality of turbulators 290 disposed within the first and second plenums 266a, 266b and coupled to at least a portion of inner surfaces (as shown in FIG. 4B) of the first and second end portions 262a, 262b respectively. In one embodiment, at least one turbulator of the plurality of turbulators 290 is a fin. In some other embodiments, at least one turbulator of the plurality of turbulators 290 may include one of a groove, a dimple, a protrusion, or combinations thereof. The plurality of turbulators 290 may be configured to increase surface area of the first and second plenums 266a, 266b and thereby dissipate substantially large quantity of heat from at least one of a first and second components 102, 104 via portions 282a, 282b of the cooling fluid 282. The plurality of turbulators 290 may also act to trip boundary layer of a flow of the cooling fluid 222 to induce an increased heat transfer coefficient and thereby improve cooling effectiveness.

FIG. 4B illustrates a sectional view of the second end portion 263b of the compliant seal component 256 taken along line B-B in FIG. 4A according to one embodiment of the description. In the illustrated embodiment, the second end portion 263b includes a plurality of walls 228 spaced apart from each other and disposed within the second plenum 266b. The plurality of walls 228 and the second end portion 263b defines a plurality of sub-plenums $266b_1$, $266b_2$, $266b_3$. In the illustrated embodiment, the second end portion 263b further includes the plurality of turbulators 290 disposed within the sub-plenum $266b_2$ and coupled to at least a portion of inner surfaces 292 of the second end portion 262b. In such an example embodiment, the portion 282b of the cooling fluid 282 flows from the second inlet hole 268b to the second outlet hole 270b of the sub-plenum $266b_2$ along a tortuous path defined by the plurality of turbulators 290 to induce the increased heat transfer coefficient between the second end portion 262b and the second component 104 and thereby improving cooling effectiveness of the compliant seal component 256.

Compliant seal component having plenums filled with a cooling fluid may be used to effectively cool the compliant seal component. Thus, the compliant seal component of the present disclosure may be less susceptible to degradation and creeping, thereby enabling the compliant seal component to be effectively used to regulate leakage of the cooling fluid into the hot flow path for a long duration. Further, turbulators disposed within the plenums may increase the heat dissipation capacity of the cooling fluid.

Figure 5:
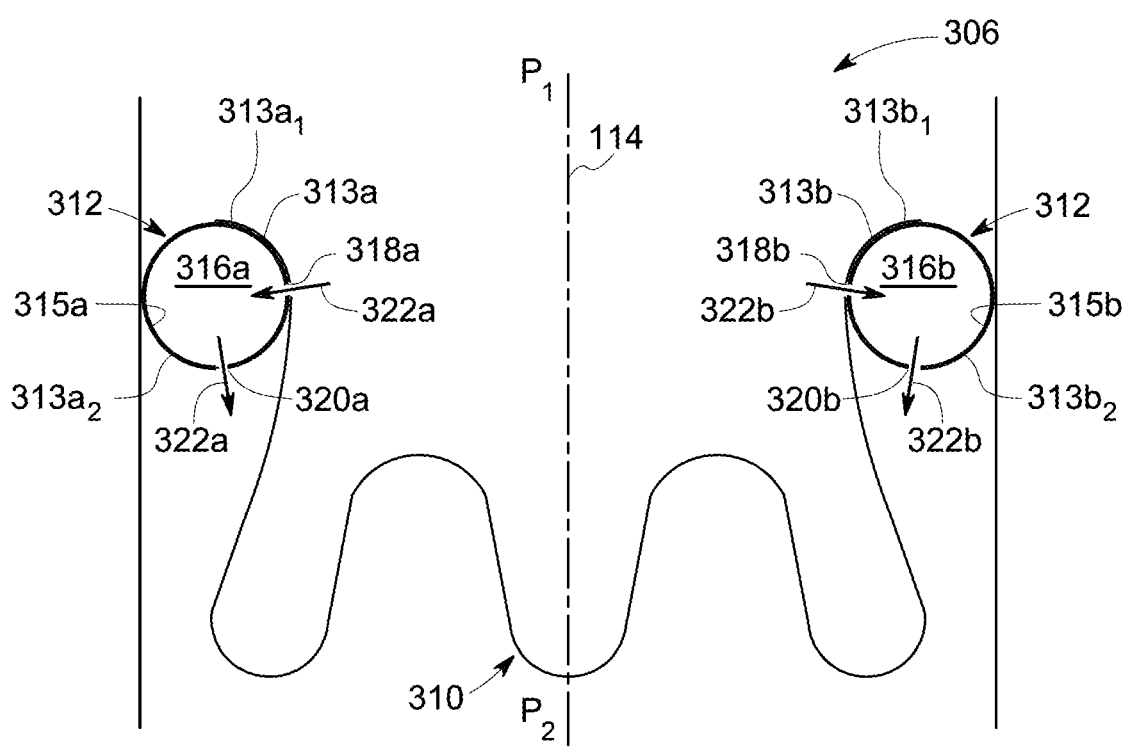
FIG. 5 is a block diagram of a compliant seal component, in accordance with another embodiment of the description.

FIG. 5 is a block diagram of a compliant seal component 306 according to another embodiment of the description. The compliant seal component 306 includes a convoluted portion 310 and a plurality of end portions 312. The plurality of end portions 312 includes a first end portion 313a and a second end portion 313b. The first end portion 313a includes a first section $313a_1$ and a second section $313a_2$. Similarly, the second end portion 313b includes a first section $313b_1$ and a second section $313b_2$. In one example embodiment, the first section $313a_1$ contacts a first component and the second section $313a_2$ includes a hollow component 315a coupled to the first section $313a_1$ of the first end portion 313a. The hollow component 315a defines a first plenum 316a. Similarly, the first section $313b_1$ contacts a second component and the second section $313b_2$ includes a hollow component 315b coupled to the first section $313b_1$ of the second end portion 313b. The hollow component 315a defines a first plenum 316a. In such an example embodiment, each of the second sections $313a_2$, $313b_2$ is coupled to the respective first sections $313a_1$, $313b_1$ using suitable coupling mechanisms, such as brazing, welding, and the like to form the compliant seal component 306. The first end portion 313a further includes a first inlet hole 318a and a first outlet hole 320a. Similarly, the second end portion 313b includes a second inlet hole 318b and a second outlet hole 320b. In the illustrated embodiment, the first section $313a_1$ and the second section $313a_2$ includes the first inlet hole 318a. The second section $313a_2$ further includes the first outlet hole 320a. Further, the first section $313b_1$ and the second section $313b_2$ includes the second inlet hole 318b. The second section $313b_2$ further includes the second outlet hole 320b. During operation of the compliant seal component 306, the first plenum 316a is configured to receive a portion 322a of a compressed fluid via the first inlet hole 318a, and the second plenum 316b is configured to receive a portion 322b of the compressor fluid via the second inlet hole 318b. The portions 322a, 322b of the compressed fluid discharged into the first plenum 316a and the second plenum 316b is used to cool the first and second end portions 313a, 313b respectively. Further, the first and second outlet holes 320a, 320b are oriented such that portions 322a, 322b of the cooling fluid is directed or discharged from the first and second plenums 316a, 316b towards the convoluted portion 310, thereby cooling the convoluted portion 310.

Figure 6:
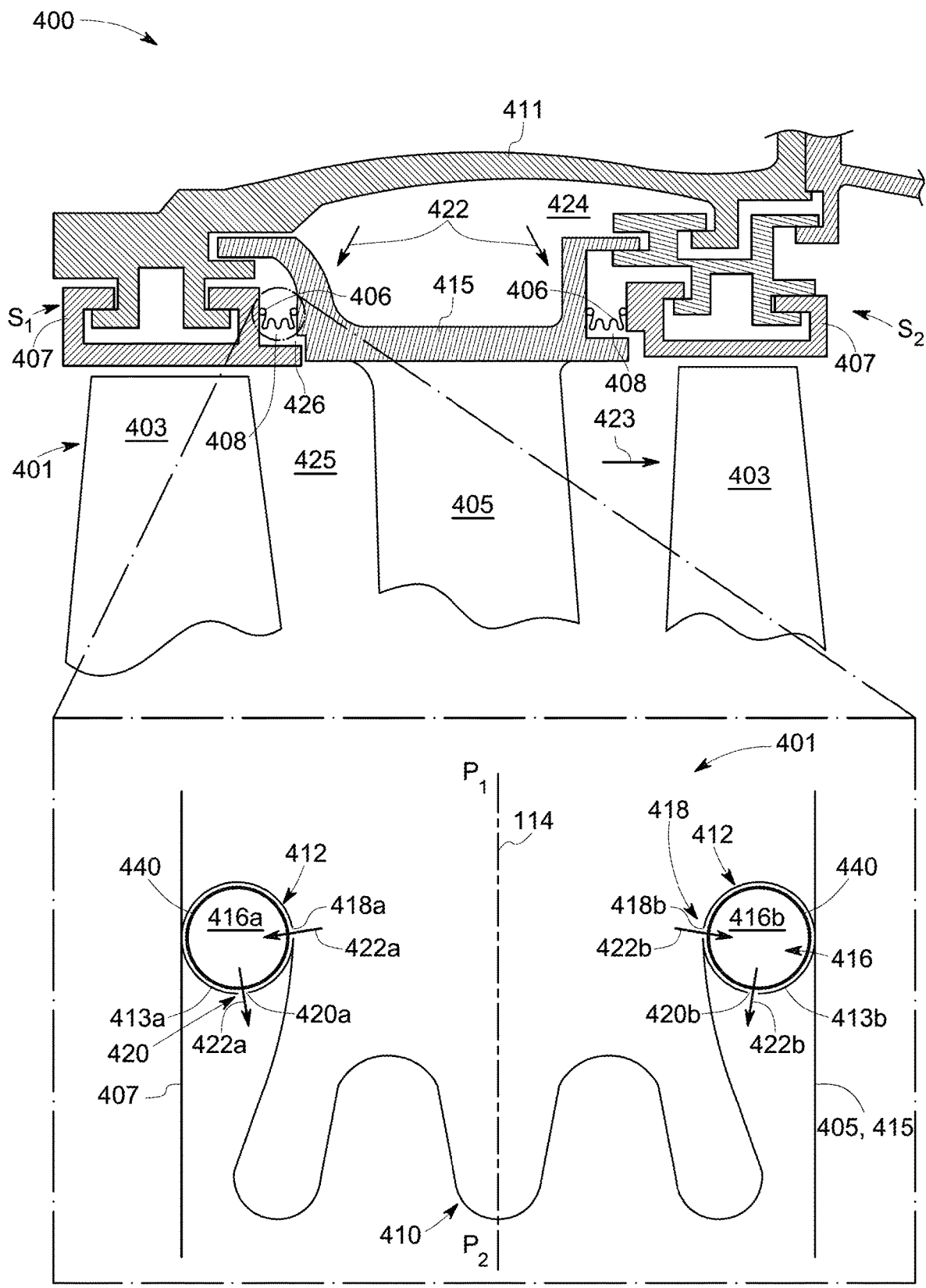
FIG. 6 is a schematic view of a portion of a turbomachine including a compliant seal component, in accordance with an embodiment of the description.

FIG. 6 is a schematic view of a portion of a turbomachine 400 including a plurality of compliant seal components 406 according to an embodiment of the description. In the illustrated embodiment, the portion of the turbomachine 400 corresponds to a high-pressure turbine. The turbomachine 400 may be a gas turbine engine, which may be aviation-based engine, a land-based engine, or a marine engine. The turbomachine 400 includes a turbine 401 including a plurality of blades 403 and a plurality of nozzles 405 (only one nozzle is shown in the embodiment of FIG. 6). The plurality of blades 403 is disposed between the nozzle 405 to define a plurality of stages "S" of the turbine 401. In the illustrated embodiment, the turbomachine 400 includes two stages "$S_1$", "$S_2$". The turbomachine 400 includes a plurality of shrouds 407 coupled to a turbine casing 411 and disposed facing the corresponding blade 403. The nozzle 405 is coupled to the turbine casing 411 via a nozzle band 415. The nozzle band 415 may include a band cavity 424 configured to receive compressor bleed fluid (i.e., cooling fluid 422). The shroud 407 and the nozzle band 415 are disposed adjacent to one another to define a clearance 408 there between the shroud 407 and the nozzle band 415. In such an example embodiment, a compliant seal component of a plurality of compliant seal components 406 is disposed in the clearance 408 such that the compliant seal component 406 contacts the shroud 407 and the nozzle band 415. Each of the plurality of compliant seal components 406 may be configured to regulate leakage of the cooling fluid 422 into hot flow path fluid 423 flowing along a hot flow path 425 including the plurality of blades 403 and the nozzle 405.

Although not illustrated, the plurality of compliant seal components 406 may be disposed in a clearance defined there between a disk (not shown in FIG. 6) of each blade 403 and a retention plate (not shown in FIG. 6) configured to hold each blade 403 to the disk. In such an embodiment, both the disk and the retention plate are configured to rotate along with each of the plurality of blades 403. In such embodiments, each of the plurality of compliant seal components 406 is configured to seal the leakage of the cooling fluid 422 into the hot flow path fluid 423 flowing along each of the plurality of blades 403.

The compliant seal component 406 is substantially similar to the compliant seal component discussed in the embodiment of FIGS. 1A, 1B, and 3. The compliant seal component 406 includes a convoluted portion 410 and a plurality of end portions 412. In one embodiment, the plurality of end portions 412 includes a first end portion 413a and a second end portion 413b. In such an embodiment, each of the first end portion 413a and second end portion 413b includes a first section and a second section, as discussed in the embodiment of FIG. 3. In one example embodiment, the second section is bent to define a first plenum 416*a* and contacts the shroud 407. Similarly, the second section is bent to define a second plenum 416*b* and contacts the nozzle 405 (i.e., the nozzle band 415). The first end portion 413*a* further includes a first inlet hole 418*a* and a first outlet hole 420*a*. Similarly, the second end portion 413*b* includes a second inlet hole 418*b* and a second outlet hole 420*b*. In the illustrated embodiment, the second section of the plurality of end portions is bent inwardly, although embodiments encompassing the second section of plurality of end portions bent outwardly are also envisaged within the present description.

In the illustrated embodiment of FIG. 6, the compliant seal component 406 further includes a plurality of turbulators 440 disposed within the first and second plenum 416*a*, 416*b* and coupled to at least a portion of inner surfaces of the first and second end portions 413*a*, 413*b* respectively. In one embodiment, at least one turbulator of the plurality of turbulators 440 is a fin. In some other embodiments, at least one turbulator of the plurality of turbulators 440 may include one of a groove, a dimple, a protrusion, or combinations thereof. It may be noted herein that the one or more turbulators 440 disposed on the inner surfaces 442 may or may not be parallel to one another. The plurality of turbulators 440 may be configured to increase surface area of the first and second plenums 416*a*, 416*b* and thereby dissipate substantially large quantity of heat from at least one of a first and second components (i.e., the shroud 407 and the nozzle 405, respectively) via portions 422*a*, 422*b* of the cooling fluid 422.

In one embodiment, a method for cooling a compliant seal component disposed in a turbomachine is presented. The method includes step (i) of directing a flow of a cooling fluid from a first cavity of the turbomachine to the compliant seal component disposed in a clearance defined between a first component and a second component of the turbomachine. The method further includes step (ii) of directing a portion of the cooling fluid from the first cavity of the turbomachine into a plenum of the compliant seal component via a plurality of inlet holes formed in the compliant seal component for cooling an end portion of a plurality of end portions of the compliant seal component. The plurality of end portions is spaced apart from each other and contacts the first component and the second component respectively. The end portion of the plurality of end portions includes a first section and a second section, the second section defining the plenum. The end portion further includes the plurality of inlet holes and a plurality of outlet holes.

Figure 7:
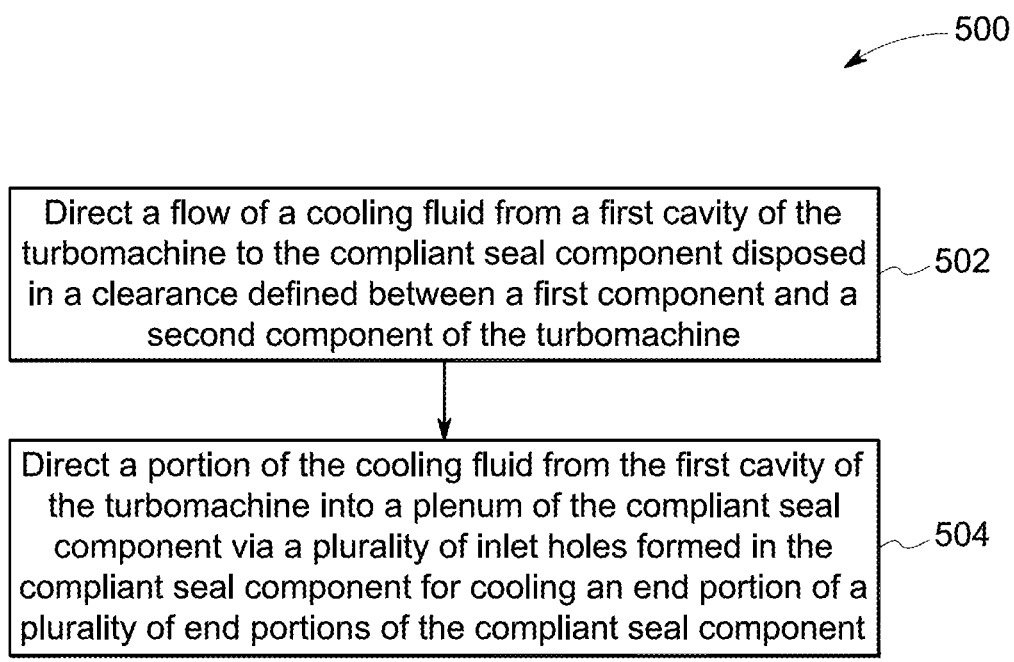
FIG. 7 is a flow chart for a method of cooling a compliant seal component disposed in a turbomachine, in accordance with one embodiment of the description.

FIG. 7 illustrates a method 500 for cooling a compliant seal component (as shown in the embodiments of FIGS. 1-5) disposed in a turbomachine 400, according to one embodiment of the description. The method 500 is discussed herein with reference to the embodiment of FIG. 6. The method 500 includes a step (i) of directing a flow of a cooling fluid 422 from a first cavity 424 of the turbomachine 400 to the compliant seal component 406 disposed in a clearance 408 defined between a first component 407 and a second component 405 of the turbomachine 400, as shown in stage 502. Further, the method 500 includes a step (ii) of directing a portion 422*a*, 422*b* of the cooling fluid 422 from the first cavity 424 of the turbomachine 400 into a plenum 416 of the compliant seal component 406 via a plurality of inlet holes 418 formed in the compliant seal component 406 for cooling an end portion of a plurality of end portions 412 of the compliant seal component 406, as shown in stage 504. In such embodiments, the plurality of end portions 412 is spaced apart from each other and contacts the first component 407 and the second component 405 respectively. The end portion of the plurality of end portions 412 includes a first section 412*a* and a second section 412*b*. The second section 412*b* defining the plenum. The end portion further includes the plurality of inlet holes 418 and a plurality of outlet holes 420.

In some embodiments, the step (ii) further includes discharging the portion 422*a*, 422*b* of the cooling fluid 422 from the plenum 416 to a second cavity 426 of the turbomachine 400 via the plurality of outlet holes 420. The portion 422*a*, 422*b* of the cooling fluid 422 is directed towards a convoluted portion 410 of the compliant seal component 406 for cooling the convoluted portion 410 before discharging to the second cavity 426 of the turbomachine 400. In some other embodiments, the portion 422*a*, 422*b* of the cooling fluid 422 is directed towards the first and second components 407, 405 for cooling the first and second components 407, 405 before discharging to the second cavity 426 of the turbomachine 400. In such embodiments, the cooling fluid 422 discharged to the second cavity 426 is mixed with the hot flow path fluid 423 in the second cavity 426 and a mixture of the hot flow path fluid 423 and the cooling fluid 422 is directed into the hot flow path 425. In some other embodiments, the method 500 further includes a step (iii) of increasing a surface area of the plenum 416 by providing turbulators 440 coupled to at least a portion of an inner surface 442 of the end portion 412. In such embodiments, the turbulators 440 disposed within the plenum 416 may increase the heat dissipation capacity of the cooling fluid 422.

In accordance with one or more embodiments, compliant seal component of the present description may control leakage of a cooling fluid into a main hot flow path, thereby improving performance of the turbomachine. Further, the cooling fluid directed into the plenum defined in the end portion may result in effectively cooling the portions of the compliant seal component, which are in contact with at least one of the first and second components, thereby improving the durability of the compliant seal component. Thus, the compliant seal component of the present disclosure may be used in high operating temperatures environment for effectively controlling leakage of the cooling fluid into the hot flow path. In some embodiments, the high operating temperature may be in a range from about 1200 degrees Fahrenheit to about 1800 degrees Fahrenheit.

Further aspects of the invention are provided by the subject matter of the following clauses:

1. A turbomachine comprising: a first component; a second component; a hot flowpath adjacent at least one portion of the first component or one portion the second component; a compliant seal component disposed in a clearance defined between the first component and the second component, wherein the compliant seal component comprises: a convoluted portion; and a plurality of end portions spaced apart from each other and contacts the first component and the second component respectively, wherein the plurality of end portions is joined to the convoluted portion, wherein an end portion of the plurality of end portions comprises a first section and a second section, the second section defining a plenum, wherein the end portion further comprises a plurality of inlet holes and a plurality of outlet holes.

2. The turbomachine of any preceding clause wherein the first and second components are stationary components.

3. The turbomachine of any preceding clause wherein the first and second components are rotatable components.

4. The turbomachine of any preceding clause wherein at least one of the first component or the second component comprises a ceramic matrix composite material.

5. The turbomachine of any preceding clause wherein the second section of the end portion is bent outwardly relative to a centerline axis of the compliant seal component to define the plenum.

6. The turbomachine of any preceding clause wherein the second section of the end portion is bent inwardly relative to a centerline axis of the compliant seal component to define the plenum.

7. The turbomachine of any preceding clause wherein the second section of the end portion is a hollow component coupled to the first section, the hollow component defining the plenum.

8. The turbomachine of any preceding clause, further comprising a plurality of walls spaced apart from each other, disposed within the plenum, the plurality of walls and the end portion defining a plurality of sub-plenums.

9. The turbomachine of any preceding clause wherein a portion of the end portion corresponding to a sub-plenum of the plurality of sub-plenums comprises an inlet hole of the plurality of inlet holes and an outlet hole of the plurality of outlet holes.

10. The turbomachine of any preceding clause, further comprising a turbulator disposed within the plenum and coupled to at least a portion of an inner surface of the end portion.

11. The turbomachine of any preceding clause, further comprising a first cavity fluidly coupled with the inlet holes formed in the compliant seal component and providing a supply of the cooling fluid.

12. The turbomachine of any preceding clause wherein the first cavity is one of a band cavity of a nozzle or a rotor of the turbomachine.

13. The turbomachine of any preceding clause, further comprising a second cavity fluidly coupled between the outlet holes and the hot flow path.

14. The turbomachine of any preceding clause wherein the pressure of the cooling fluid in the first cavity is higher than pressure of fluid in the hot flow path and second cavity.

15. The turbomachine of any preceding clause, further comprising a cooling fluid adapted to flow through the plurality of inlet holes and the plurality of outlet holes and cool the plurality of end portions.

16. The turbomachine of any preceding clause wherein the cooling fluid is a bleed fluid from a compressor of the turbomachine.

17. The turbomachine of any preceding clause wherein the cooling fluid is at least one of: air, water, or nitrogen.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbomachine, comprising:
   a first component;
   a second component;
   a hot flowpath adjacent at least one portion of the first component or one portion the second component; and
   a compliant seal component disposed in a clearance defined between the first component and the second component, wherein the compliant seal component comprises:
   a convoluted portion; and
   a plurality of end portions spaced apart from each other and contacts the first component and the second component respectively, wherein the plurality of end portions is joined to the convoluted portion, wherein an end portion of the plurality of end portions comprises a first section and a second section, the second section defining a plenum, wherein the end portion of the plurality of end portions further comprises a plurality of inlet holes and a plurality of outlet holes.

2. The turbomachine of claim 1 wherein the first component and the second component are stationary components.

3. The turbomachine of claim 1 wherein the first component and the second component are rotatable components.

4. The turbomachine of claim 1 wherein at least one of the first component or the second component comprises a ceramic matrix composite material.

5. The turbomachine of claim 1 wherein the second section of the end portion of the plurality of end portions is bent outwardly relative to a centerline axis of the compliant seal component to define the plenum.

6. The turbomachine of claim 1 wherein the second section of the end portion of the plurality of end portions is bent inwardly relative to a centerline axis of the compliant seal component to define the plenum.

7. The turbomachine of claim 1 wherein the second section of the end portion of the plurality of end portions is a hollow component coupled to the first section, the hollow component defining the plenum.

8. The turbomachine of claim 1, further comprising a plurality of walls spaced apart from each other, disposed within the plenum, the plurality of walls and the end portion defining a plurality of sub-plenums.

9. The turbomachine of claim 8 wherein a portion of the end portion of the plurality of end portions corresponding to a sub-plenum of the plurality of sub-plenums comprises an inlet hole of the plurality of inlet holes and an outlet hole of the plurality of outlet holes.

10. The turbomachine of claim 1, further comprising a turbulator disposed within the plenum and coupled to at least a portion of an inner surface of the end portion of the plurality of end portions.

11. The turbomachine of claim 1, further comprising a first cavity fluidly coupled with the inlet holes formed in the compliant seal component and providing a supply of a cooling fluid.

12. The turbomachine of claim 11 wherein the first cavity is one of a band cavity of a nozzle or a rotor of the turbomachine.

13. The turbomachine of claim 11, further comprising a second cavity fluidly coupled between the outlet holes and the hot flow-path.

14. The turbomachine of claim 13 wherein a pressure of the cooling fluid in the first cavity is higher than pressure of fluid in the hot flowpath and the second cavity.

15. The turbomachine of claim 1, further comprising a cooling fluid adapted to flow through the plurality of inlet holes and the plurality of outlet holes and cool the plurality of end portions.

16. The turbomachine of claim 15 wherein the cooling fluid is a bleed fluid from a compressor of the turbomachine.

17. The turbomachine of claim 15 wherein the cooling fluid is at least one of: air, water, or nitrogen.

* * * * *